(12) United States Patent
Mori et al.

(10) Patent No.: US 9,583,129 B2
(45) Date of Patent: Feb. 28, 2017

(54) METHOD OF MANUFACTURING MAGNETIC RECORDING MEDIUM

(71) Applicant: FUJIFILM Corporation, Minato-ku, Tokyo (JP)

(72) Inventors: Masahiko Mori, Kanagawa (JP); Hiroyuki Suzuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 214 days.

(21) Appl. No.: 14/464,024

(22) Filed: Aug. 20, 2014

(65) Prior Publication Data

US 2014/0356525 A1 Dec. 4, 2014

Related U.S. Application Data

(62) Division of application No. 13/427,579, filed on Mar. 22, 2012, now Pat. No. 8,840,802.

(30) Foreign Application Priority Data

Mar. 25, 2011 (JP) ................. 2011-067549

(51) Int. Cl.
  *H01F 1/11* (2006.01)
  *G11B 5/706* (2006.01)
  *G11B 5/842* (2006.01)

(52) U.S. Cl.
  CPC ........... *G11B 5/842* (2013.01); *G11B 5/70678* (2013.01); *H01F 1/11* (2013.01)

(58) Field of Classification Search
  CPC .......... H01F 1/11; H01F 1/113; H01F 1/0054; H01F 1/0315; H01F 1/15333; H01F 41/16; G11B 5/70678; G11B 5/7305; G11B 5/842; G11B 5/7013; G11B 5/65; G11B 5/70605; C04B 2235/767

(Continued)

(56) References Cited

U.S. PATENT DOCUMENTS

| 8,545,714 B2 | 10/2013 | Suzuki et al. |
| 2003/0113585 A1* | 6/2003 | Mori ............ G11B 5/70 428/842.8 |

(Continued)

FOREIGN PATENT DOCUMENTS

| JP | 59-175706 A | 10/1984 |
| JP | 2004-030828 A | 1/2004 |

(Continued)

OTHER PUBLICATIONS

Machine translation of JP2004030828A, printed May 11, 2016, 9 pages.*

(Continued)

*Primary Examiner* — Matthew E Hoban
*Assistant Examiner* — Lynne Edmondson
(74) *Attorney, Agent, or Firm* — Sughrue Mion, PLLC

(57) ABSTRACT

An aspect of the present invention relates to a method of manufacturing hexagonal ferrite magnetic powder. The method of manufacturing hexagonal ferrite magnetic powder comprises wet processing hexagonal ferrite magnetic particles obtained following acid treatment in a water-based solvent to prepare an aqueous magnetic liquid satisfying relation (1) relative to an isoelectric point of the hexagonal ferrite magnetic particles: pH0−pH*≥2.5, wherein, pH0 denotes the isoelectric point of the hexagonal ferrite magnetic particles and pH* denotes a pH of the aqueous magnetic liquid, which is a value of equal to or greater than 2.0, adding a surface-modifying agent comprising an alkyl group and a functional group that becomes an anionic group in the aqueous magnetic liquid to the aqueous magnetic liquid to subject the hexagonal ferrite magnetic particles to a surface-modifying treatment, and removing the water-based solvent following the surface-modifying treatment to obtain hexagonal ferrite magnetic particles.

7 Claims, 1 Drawing Sheet

(58) Field of Classification Search
USPC ...... 252/842.8, 842, 842.3, 843, 840.6, 836,
252/842.2, 842.5, 843.1; 428/62.63,
428/62.51 R, 62.56, 62.58, 62.54; 427/128
See application file for complete search history.

(56) References Cited

U.S. PATENT DOCUMENTS

2007/0020489 A1* 1/2007 Yamazaki .............. B82Y 30/00
428/842.8
2009/0087684 A1* 4/2009 Omura ................. B22F 1/0062
428/800

FOREIGN PATENT DOCUMENTS

| | | | |
|---|---|---|---|
| JP | 2004030828 A | * | 1/2004 |
| JP | 2010-049754 A | | 3/2010 |
| JP | 2010-113743 A | | 5/2010 |
| JP | 2011-018423 A | | 1/2011 |

OTHER PUBLICATIONS

Office Action dated Feb. 26, 2103 in Japanese Application No. 2011-067549.

* cited by examiner

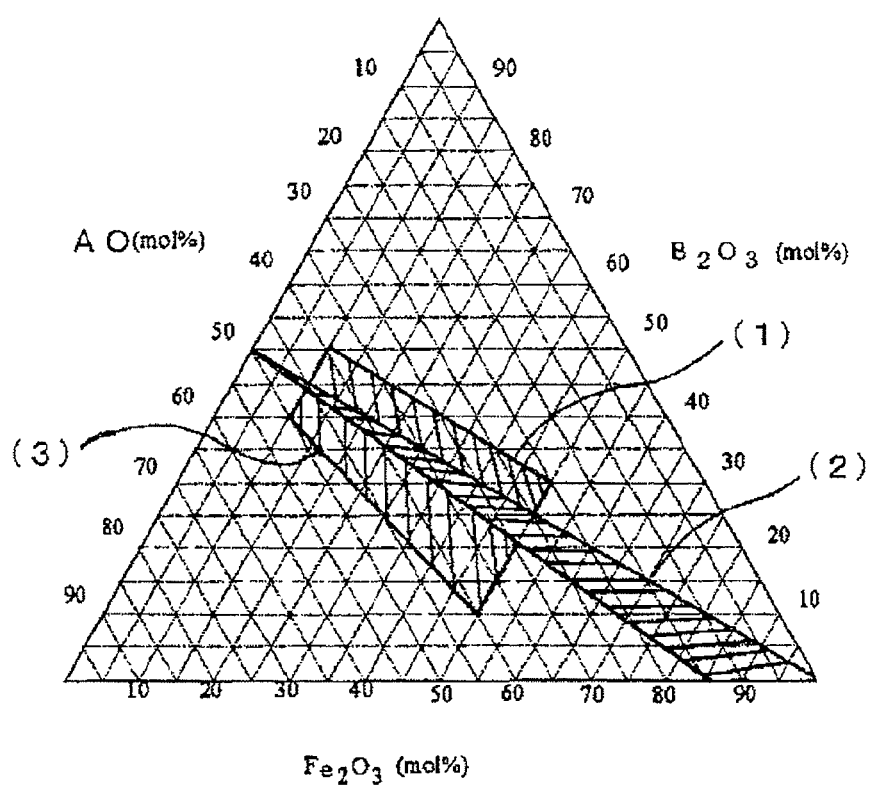

ously incor- 10 treating the solidified product (causing hexagonal ferrite
METHOD OF MANUFACTURING MAGNETIC RECORDING MEDIUM

CROSS-REFERENCE TO RELATED APPLICATIONS

This is a Divisional Application of U.S. application Ser. No. 13/427,579, filed Mar. 22, 2012, which claims priority under 35 USC 119, from JP Application No. 2011-067549 filed on Mar. 25, 2011, the disclosures of which are incorporated herein by reference in their entirety.

BACKGROUND OF THE INVENTION

Field of the Invention

The present invention relates to a method of manufacturing hexagonal ferrite magnetic powder, and more particularly, to a method of manufacturing hexagonal ferrite magnetic powder which can readily achieve a highly-dispersed state in a magnetic layer-forming coating material of a magnetic recording medium.

The present invention further relates to a magnetic recording medium having a magnetic layer comprising hexagonal ferrite magnetic powder obtained by the above manufacturing method, and to a method of manufacturing the same.

Discussion of the Background

In recent years, the means of rapidly transmitting information have undergone considerable development, permitting the transmission of data and images containing immense amounts of information. With this improvement in data transmission technology has come the demand for higher density recording in recording media and recording and reproduction devices for recording, reproducing, and storing information. The high dispersion of microparticulate magnetic powder and increased smoothing of the surface of the magnetic layer to reduce spacing loss are known to be effective ways of achieving good electromagnetic characteristics in the high-density recording region.

Reference 1, Japanese Unexamined Patent Publication (KOKAI) No. 2004-30828, which is expressly incorporated herein by reference in its entirety, for example, proposes a method of increasing the dispersibility of magnetic powder by wet dispersing hexagonal ferrite magnetic powder along with a surface treatment agent with a pKa of 1 to 4. In Reference 1, the surface treatment agent is a strong acid with a lower pKa than that of the fatty acids employed in the magnetic layer, causing adsorption to the magnetic particle surface and enhancing dispersion.

In the method specifically described in Examples of Reference 1, during the preparation of hexagonal ferrite magnetic particles by the glass crystallization method, microcrystals that are obtained by removing the glass component by acid treatment are washed with water and then subjected to the above wet dispersion. Following wet dispersion, the magnetic powder settles out in an aqueous slurry, and is collected by concentration, dehydration, and drying. Since a considerable load is then required to pulverize the magnetic powder thus solidified and to disperse it in microparticulate form, there is a risk of the magnetic powder being damaged by the dispersion medium.

SUMMARY OF THE INVENTION

The present invention provides for magnetic powder that can be readily dispersed without applying a large dispersion load in a magnetic coating material for forming a magnetic layer.

The glass crystallization method that is employed in Examples of Reference 1 is suitable as a method of obtaining microparticulate hexagonal ferrite magnetic powder. Accordingly, the present inventors conducted extensive research into discovering a means of obtaining hexagonal ferrite magnetic powder that was readily dispersible in the magnetic coating material for forming a magnetic layer by the glass crystallization method.

In general, the glass crystallization method comprises the steps of (1) melting a starting material mixture containing glass-forming components and hexagonal ferrite-forming components, (2) rapidly cooling and solidification, (3) heat treating the solidified product (causing hexagonal ferrite crystals to precipitate), (4) treating the solidified product with an acid (to remove the glass component by dissolution), and (5) cleaning with a water-based solvent. The present inventors thought that by adequately covering the surface of the hexagonal ferrite magnetic particles with a compound having a hydrophobic group during the steps of the glass crystallization method, it might be possible to greatly reduce the dispersion load in the magnetic coating material for forming the magnetic layer. Since the magnetic coating material for forming the magnetic layer was prepared using an organic solvent, if the surface of the magnetic particles were adequately covered with hydrophobic groups, in an organic solvent (in a hydrophobic environment), it was surmised that the hydrophobic groups would exhibit affinity for the organic solvent and permit ready dispersion in microparticulate form. Based on this technical concept, the present inventors conducted further extensive research, resulting in discoveries (A) and (B) below.

(A) In the cleaning step of the glass crystallization method, imparting an adequate positive charge to the surface of the magnetic particles in a water-based solvent allows individual magnetic particles to exist in a state of high magnetic separation. Further, when the surface of the magnetic particles is in an adequately positively charged state and a surface-modifying agent having anionic groups and hydrophobic groups is present, the anionic groups adsorb to positively charged sites on the surface of the magnetic particles, thereby making it possible for an adequate quantity of surface-modifying agent to be present on the surface of the magnetic particles (and thus render the surface of the magnetic particles adequately hydrophobic). Further, by causing the surface-modifying agent to adsorb to the magnetic particles while they are in a highly magnetically dispersed state, it is possible to cause the surface-modifying agent to adsorb uniformly to the surface of the individual hexagonal ferrite magnetic particles. Thus, the hexagonal ferrite magnetic particles can be highly dispersed in the magnetic coating material in a state approaching primary particles.

(B) Magnetic particles with surfaces that have been rendered hydrophobic aggregate in water-based solvents. However, the aggregate that forms is nothing more than an association caused by the interaction of hydrophobic groups. Thus, in a magnetic coating material for forming a magnetic layer, the aggregated state can be readily eliminated. That is, dispersion is readily possible without applying a large dispersion load in the magnetic material for forming the magnetic layer.

The present inventors conducted further research based on the above discoveries, resulting in the present invention.

An aspect of the present invention relates to a method of manufacturing hexagonal ferrite magnetic powder, which comprises:

preparing a melt by melting a starting material mixture comprising a hexagonal ferrite-forming component and a glass-forming component and rapidly cooling the melt to obtain a solidified product, heating the solidified product to precipitate hexagonal ferrite magnetic particles and crystallized glass components in the solidified product, subjecting the solidified product to an acid treatment following the heating to remove the glass components by dissolution, wet processing the hexagonal ferrite magnetic particles obtained following the acid treatment in a water-based solvent to prepare an aqueous magnetic liquid satisfying relation (1) relative to an isoelectric point of the hexagonal ferrite magnetic particles:

$$pH0-pH^* \geq 2.5 \qquad (1)$$

where in relation (1), pH0 denotes the isoelectric point of the hexagonal ferrite magnetic particles and pH* denotes a pH of the aqueous magnetic liquid, which is a value of equal to or greater than 2.0, adding a surface-modifying agent comprising an alkyl group and a functional group that becomes an anionic group in the aqueous magnetic liquid to the aqueous magnetic liquid to subject the hexagonal ferrite magnetic particles to a surface-modifying treatment, and removing the water-based solvent following the surface-modifying treatment to obtain hexagonal ferrite magnetic particles.

The starting material mixture may comprise Al.

The starting material mixture may comprise 1.0 to 10.0 mole percent of Al, based on $Al_2O_3$ conversion, relative to a total of the starting material mixture based on oxide conversion.

The surface-modifying agent may be selected from the group consisting of a compound denoted by general formula (I) and a compound denoted by general formula (II):

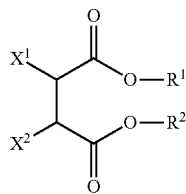

(I)

wherein, in general formula (I), each of $R^1$ and $R^2$ independently denotes an alkyl group with 5 to 10 carbon atoms; and $X^1$ and $X^2$ denote hydrogen atoms or substituents, with either $X^1$ or $X^2$ denoting a functional group that becomes an anionic group in the magnetic liquid;

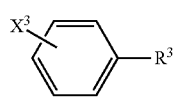

(II)

wherein, in general formula (II), $R^3$ denotes an alkyl group with 12 to 17 carbon atoms, and $X^3$ denotes a functional group that becomes an anionic group in the magnetic liquid.

The wet processing may comprise pH adjustment with addition of acid.

The functional group that becomes an anionic group in the magnetic liquid is a sulfonic acid group or a sulfonate group.

In general formula (I), either $X^1$ or $X^2$ may denote the functional group that becomes an anionic group in the magnetic liquid, and the other may denote a hydrogen atom.

A further aspect of the present invention relates to hexagonal ferrite magnetic powder manufactured by the above manufacturing method.

A still further aspect of the present invention relates to a method of manufacturing a magnetic recording medium, which comprises:

manufacturing hexagonal ferrite magnetic powder by the method according to claim 1, dispersing the hexagonal ferrite magnetic powder together with an organic solvent and a binder to prepare a magnetic coating material, and forming a magnetic layer with the magnetic coating material that has been prepared.

The organic solvent may comprise a ketone solvent.

A still further aspect of the present invention relates to a magnetic recording medium manufactured by the above manufacturing method.

The present invention can provide a magnetic recording medium exhibiting good electromagnetic characteristics in which hexagonal ferrite magnetic powder is dispersed to a high degree.

Since dispersion of the hexagonal ferrite magnetic powder can be facilitated, the dispersion load on the magnetic powder can be greatly reduced in the manufacturing process.

Other exemplary embodiments and advantages of the present invention may be ascertained by reviewing the present disclosure and the accompanying drawing.

BRIEF DESCRIPTION OF THE DRAWINGS

The present invention will be described in the following text by the exemplary, non-limiting embodiments shown in the FIGURE, wherein:

FIG. 1 is a descriptive drawing (triangular phase diagram) showing an example of the composition of the starting material mixture.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

The method of manufacturing hexagonal ferrite magnetic powder, which comprises:

preparing a melt by melting a starting material mixture comprising a hexagonal ferrite-forming component and a glass-forming component and rapidly cooling the melt to obtain a solidified product, heating the solidified product to precipitate hexagonal ferrite magnetic particles and crystallized glass components in the solidified product, subjecting the solidified product to an acid treatment following the heating to remove the glass components by dissolution, wet processing the hexagonal ferrite magnetic particles obtained following the acid treatment in a water-based solvent to prepare an aqueous magnetic liquid satisfying relation (1) relative to an isoelectric point of the hexagonal ferrite magnetic particles:

$$pH0-pH^* \geq 2.5 \qquad (1)$$

where in relation (1), pH0 denotes the isoelectric point of the hexagonal ferrite magnetic particles and pH* denotes a pH of the aqueous magnetic liquid, which is a value of equal to or greater than 2.0, adding a surface-modifying agent comprising an alkyl group and a functional group that becomes an anionic group in the aqueous magnetic liquid to the aqueous magnetic liquid to subject the hexagonal ferrite magnetic particles to a surface-modifying treatment, and removing the water-based solvent following the surface-modifying treatment to obtain hexagonal ferrite magnetic particles.

The method of manufacturing hexagonal ferrite magnetic powder of the present invention can provide hexagonal ferrite magnetic powder that is capable of readily achieving a state of a high degree of dispersion in an organic solvent by subjecting the hexagonal ferrite magnetic particles obtained following removing the glass components by an acid treatment to the prescribed treatment, described further below, in the glass crystallization method.

The method of manufacturing hexagonal ferrite magnetic powder of the present invention will be described in greater detail below.

The starting material mixture employed in the glass crystallization method contains a glass-forming component and a hexagonal ferrite-forming component, and in the present invention, the starting material containing at least the above components are employed. The term "glass-forming component" refers to a component that is capable of exhibiting a glass transition phenomenon to form an amorphous material (vitrify). A $B_2O_3$ component is normally employed as a glass-forming component in the glass crystallization method. In the present invention, it is possible to employ a starting material mixture containing a $B_2O_3$ component as the glass-forming component. In the glass crystallization method, the various components contained in the starting material mixture are present in the form of oxides or various salts that can be converted to oxides in a step such as melting. In the present invention, the term "$B_2O_3$ component" includes $B_2O_3$ itself and various salts, such as $H_3BO_3$, that can be changed into $B_2O_3$ in the process. The same holds true for other components. Examples of glass-forming components other than $B_2O_3$ components are $SiO_2$ components, $P_2O_5$ components, and $GeO_2$ components.

Metal oxides such as $Fe_2O_3$, BaO, SrO, and PbO that serve as constituent components of hexagonal ferrite magnetic powder are examples of the hexagonal ferrite-forming component in the starting material mixture. For example, the use of a BaO component as the main component of the hexagonal ferrite-forming component makes it possible to obtain barium ferrite magnetic powder. The content of the hexagonal ferrite-forming component in the starting material mixture can be suitably set based on the desired electromagnetic characteristics.

The composition of the starting material mixture is not specifically limited. For example, the starting materials within the composition regions of hatched portions (1) to (3) in the triangular phase diagram shown in FIG. 1, with an AO component (wherein A denotes one or more selected from among Ba, Sr, Ca, and Pb, for example), $B_2O_3$ component, and $Fe_2O_3$ component as vertices, are desirable to achieve a high coercive force Hc and saturation magnetization σs. The starting materials within the component region (hatched portion (3)) defined by the four points a, b, c, and d below are particularly desirable. As set forth above, a portion of the $B_2O_3$ component can be replaced with another glass-forming component such as a $SiO_2$ component or a $GeO_2$ component. As set forth further below, it is also possible to replace a portion of the $Fe_2O_3$ component to adjust the coercive force. In addition, as set forth further below, an Al compound can be employed as a glass-forming component by replacing a portion of the $B_2O_3$ component with the Al compound.

(a) $B_2O_3$=44, AO=46, $Fe_2O_3$=10 mole percent
(b) $B_2O_3$=40, AO=50, $Fe_2O_3$=10 mole percent
(c) $B_2O_3$=21, AO=29, $Fe_2O_3$=50 mole percent
(d) $B_2O_3$=10, AO=40, $Fe_2O_3$=50 mole percent.

A portion of the Fe can be replaced with other metal elements to adjust the coercive force of the hexagonal ferrite magnetic powder obtained. Examples of these replacement elements are Co—Zn—Nb, Zn—Nb, Co, Zn, Nb, Co—Ti, Co—Ti—Sn, Co—Sn—Nb, Co—Zn—Sn—Nb, Co—Zn—Zr—Nb, and Co—Zn—Mn—Nb. To obtain such a hexagonal ferrite magnetic powder, it suffices to employ an additional hexagonal ferrite-forming component to adjust the coercive force. Examples of coercive force-adjusting components are divalent metal oxide components such as CoO and ZnO, and tetravalent metal oxide components such as $TiO_2$, $ZrO_2$, $SnO_2$ and $MnO_2$, and pentavalent metal oxide components such as $Nb_2O_5$. When employing such a coercive force-adjusting component, the content can be suitably determined to achieve the desired coercive force or the like.

In the present invention, a starting mixture containing Al (aluminum) is desirably employed. That is because by incorporating Al, it is possible to raise the isoelectric point of the hexagonal ferrite magnetic particles obtained following the acid treatment. The higher the isoelectric point pH of the magnetic particles obtained after the acid treatment, the greater the value of (pH0−pH*), described in detail below, of the aqueous magnetic solution for a given pH*. The higher this value becomes, the greater the positive charge present on the surface of the magnetic particles, meaning that the surface of the magnetic particles is adequately positively charged. In related fashion, it is known that in a slurry of water-based solvent containing charged particles, the electrolyte concentration (ion concentration) in the slurry generally affects the state of dispersion/aggregation. When the electrolyte concentration is low, electric double layers widen around the charged particles, repulsive forces operate to prevent overlapping of these electric double layers, and the charged particles can be maintained in a good state of dispersion. Accordingly, adequately positively charging the surface can cause the repulsive forces between the charged particles to cause the individual hexagonal ferrite magnetic particles to remain in a highly dispersed state. The positive charge of the surface can cause the surface-modifying agent, described further below, to tend to adsorb by means of its anionic groups, thereby making it possible to render the surface of the magnetic particles adequately hydrophobic. Here, causing the surface-modifying agent, described further below, to adsorb while in a good state of dispersion makes it possible to cause the surface-modifying agent to adsorb uniformly to the surface of the individual hexagonal ferrite magnetic particles. Thus, the hexagonal ferrite magnetic particles can be dispersed to a high degree in the magnetic coating material in a state close to that of primary particles. The higher the isoelectric point of the magnetic particles obtained following the acid treatment, the milder the conditions under which the wet processing can be conducted to obtain the aqueous magnetic solution satisfying relation (1). By contrast, the lower the isoelectric point of the magnetic particles obtained following the acid treatment, the more intense the conditions under which the wet processing is conducted to obtain the aqueous magnetic solution satisfying relation (1). Accordingly, the fact that the isoelectric point of the hexagonal ferrite magnetic particles obtained following the acid treatment can be raised by using a starting material mixture containing Al is advantageous in that it permits conducting the wet processing under milder conditions.

Al can be added as an oxide, or as various salts (hydroxides and the like) that can be converted to oxides in steps such as melting. The use of a starting material mixture comprising equal to or more than 1.0 mole percent of Al based on $Al_2O_3$ conversion relative to the total based on oxide conversion is desirable for the reasons set forth above. Based on investigation conducted by the present inventors, a hard medium surface was achieved in a magnetic recording medium prepared using hexagonal ferrite magnetic particles obtained from a starting material mixture containing a large amount of Al. When the medium surface is hard, the head sometimes wears down and output drops. From the perspective of ensuring output, the use of a starting material mixture containing equal to or less than 10.0 mole percent of Al based on $Al_2O_3$ relative to the total based on oxide conversion is desirable.

The above starting material mixture can be obtained by weighing out and mixing the various components. Then, the starting material mixture is melted in a melting vat to obtain a melt. The melting temperature can be set based on the starting material composition, normally, to 1,000 to 1,500° C. The melting time can be suitably set for suitable melting of the starting material mixture.

Next, the melt that is obtained is rapidly cooled to obtain a solidified product. The solidified product is an amorphous material in the form of glass-forming components that have been rendered amorphous (vitrified). The rapid cooling can be carried out in the same manner as in the rapid cooling step commonly employed to obtain an amorphous material in glass crystallization methods. For example, a known method can be conducted, such as a rapid cooling rolling method in which the melt is poured onto a pair of water-cooling rollers being rotated at high speed.

Following rapid cooling, the amorphous material obtained is heat treated. This step causes hexagonal ferrite magnetic particles and crystallized glass components to precipitate. Considering the hexagonal ferrite magnetic particle nucleus-generating temperature, the crystallization temperature is desirably equal to or higher than 580° C. and equal to or lower than 760° C., and preferably equal to or higher than 600° C. and equal to or lower than 760° C.

The particle size of the precipitating hexagonal ferrite magnetic powder can be controlled by means of the crystallization temperature and the period of heating during crystallization. The crystallization temperature and the period of heating are desirably determined so as to obtain hexagonal ferrite magnetic particle with a particle diameter (primary particle diameter) of equal to or less than 35 nm, preferably 15 to 30 nm, suited as a particle diameter of magnetic material for magnetic recording media for high-density recording. The rate at which the temperature is raised to the crystallization temperature is suitably, for example, about 0.2 to 10° C./minute, and desirably, 0.5 to 5° C./minute. The period of maintenance within this temperature range is, for example, 0.5 to 24 hours, and desirably, 1 to 8 hours. In the pulverization processing and coating material dispersion processing described further below, the particle size of the hexagonal ferrite magnetic particle does not substantially change.

Hexagonal ferrite magnetic powder and crystallized glass components precipitate in the heat-treated product that has been subjected to the heat treatment in the above crystallization step. Accordingly, when the heat-treated product is subjected to the acid treatment, the crystallized glass component that is surrounding the particles is dissolved away, yielding hexagonal ferrite magnetic particles.

Prior to the acid treatment, it is desirable to conduct pulverization processing to enhance the efficiency of the acid treatment. Coarse pulverization can be conducted by either a dry or wet method. However, from the perspective of achieving uniform pulverization, a wet method is desirable. The pulverization processing conditions can be set according to a known method, or reference can be made to Examples set forth further below.

The acid treatment can be conducted by the methods that are commonly employed in the glass crystallization method, such as an acid treatment with heating. It is desirably conducted in an aqueous solution (desirably with an acid concentration of about 2 to 25 weight percent) of acetic acid, formic acid, butyric acid, or the like with heating to 60 to 90° C. for about 0.5 to 10 hours, it being desirable to retain the coarse pulverization product. That makes it possible to melt away the glass components that crystallize. When Al is coated on the surface of the particles, the particles can be subjected following the acid treatment to an alkali treatment to remove part of the Al coating to control the surface charge. The alkali treatment can be conducted by cleaning the particles after the acid treatment with an alkali aqueous solution such as potassium hydroxide.

Next, the hexagonal ferrite magnetic particles from which the surrounding glass components have been removed by the acid treatment are subjected to wet processing in a water-based solvent to prepare an aqueous magnetic liquid satisfying the relation (1) relative to the isoelectric point of the hexagonal ferrite magnetic particles:

$$pH0 - pH^* \geq 2.5 \qquad (1)$$

(where in relation (1), pH0 denotes the isoelectric point of the hexagonal ferrite magnetic particles and pH* denotes the pH of the aqueous magnetic liquid, which is a value of equal to or greater than 2.0).

In the surface-modifying agent, described further below, anionic groups produced by ionization in the water-based solvent are thought to modify the surface of the magnetic particles by being adsorbed by the positive charge of the surface of the hexagonal ferrite magnetic particles. However, when the above (pH0−pH*) is equal to or greater than 0 but less than 2.5, the charge of the charged particles is low, dispersion tends not to occur, and it becomes difficult to impart to the surface of the hexagonal ferrite magnetic particles a positive charge adequate to cause the surface-modifying agent to properly adhere. When (pH0−pH*) assumes a negative value, hexagonal ferrite magnetic particles have a negative surface charge, making it difficult to modify the surface of the magnetic particles with the surface-modifying agent. Accordingly, in the present invention, an aqueous solution with a (pH0−pH*) of equal to or greater than 2.5 is prepared. Preparing hexagonal ferrite magnetic particles with surfaces that are adequately positively charged, causing them to be present in an individually magnetically separated and dispersed state, and subjecting the magnetic particles in this state to the action of a surface-modifying agent makes it possible to cause the surface-modifying agent to uniformly adsorb to the surface of the individual magnetic particles. From these perspectives, (pH0−pH*) is desirably equal to or greater than 3.0, preferably equal to or greater than 4.0. However, when pH* is made too low with an acid, the magnetic particles dissolve and it becomes difficult to achieve the desired powder characteristics. Thus, pH* is equal to or greater than 2.0. For the same reasons as those set forth above, (pH0−pH*) is desirably equal to or lower than 8.0.

The higher the isoelectric point of the magnetic particles obtained following the acid treatment as set forth above, the milder the conditions under which the wet processing to obtain an aqueous magnetic liquid satisfying relation (1) can be conducted. By contrast, the lower the isoelectric point of the magnetic particles obtained following the acid treatment, the stronger the acid conditions under which the wet processing is conducted to obtain an aqueous magnetic liquid satisfying relation (1). The desirable pH0 range for conducting the wet processing under mild conditions is equal to or greater than 7.0, preferably equal to or greater than 7.5, and more preferably, equal to or greater than 8.0. Further the upper limit specified by pH for the zeta potential is 14.0. As set forth above, pH* is equal to or greater than 2.0. Since the isoelectric point of the hexagonal ferrite magnetic particle generally falls within a pH range of neutral to basic, the pH* satisfying relation (1) normally falls within the acidic to neutral range. By way of example, it can be about equal to or greater than 2.0 and equal to or lower than 7.5.

In the present invention, the pH0 of the hexagonal ferrite magnetic particles refers to the pH at which the zeta potential becomes 0 mV when adjusting with an acid or alkali solution a solution that is collected for measurement from the solution and diluted with water to a magnetic particle concentration of 0.02 weight percent. The zeta potential measuring apparatus employed can be a Zetasizer Nano series made by Sysmex, for example. The isoelectric point, zeta potential, and pH all refer to values measured at a solution temperature of 25° C.

The water-based solvent is a solvent comprising water as a primary component. Examples are water and mixed solvents of water and water-soluble organic solvents, such as methanol, ethanol, acetone, N,N-dimethylformamide, N,N-dimethylacetamide, and tetrahydrofuran. Water is desirable.

The wet processing can comprise cleaning with a water-based solvent, desirably water, and then adding an acid to adjust the pH. The cleaning can be conducted in combination with any known method such as stifling, decantation, filtering, centrifugal sedimentation, and ultrasonic cleaning. The acid that is added is desirably one with a pKa in water (25° C.) of equal to or less than 3 that makes it possible to control the pH by the addition of small quantities. A specific example of a desirable acid is hydrochloric acid. The quantity of acid that is added depends on the type of acid employed, and need only be established so as to keep (pH0−pH*) within the desired range.

Subsequently, the aqueous magnetic liquid that has been prepared to satisfy relation (1) is subjected to a surface-modifying treatment to cover the surface of the magnetic particles in the liquid with hydrophobic groups. In the present invention, the surface-modifying agent that is employed in the surface-modifying treatment of the magnetic particles in the magnetic liquid is a compound having a functional group that becomes an anionic group in the aqueous magnetic liquid and an alkyl group. The surface-modifying agent can be adsorbed by the positive charge of the surface of the hexagonal ferrite magnetic particles through the anionic groups generated by ionization in the aqueous magnetic liquid, thereby rendering the magnetic particles hydrophobic due to hydrophobic groups in the form of alkyl groups.

From the perspective of the hydrophobic rendering effect and solubility in the aqueous magnetic liquid, the alkyl groups present in the surface-modifying agent are desirably alkyl groups with 3 to 20 carbon atoms, preferably alkyl groups with 5 to 17 carbon atoms. The details of the functional groups that become anionic groups in the aqueous magnetic liquid and are present in the surface-modifying agent are as described further below for the compound denoted by general formulas (I) and (II).

In the present invention, unless specifically stated otherwise, the groups that are given can be substituted or unsubstituted. When a given group has a substituent, the substituent can be, for example, an alkyl group (such as an alkyl group having 1 to 6 carbon atoms), a hydroxyl group, an alkoxyl group (such as an alkoxyl group having 1 to 6 carbon atoms), a halogen atom (such as a fluorine, chlorine, or bromine atom), a cyano group, an amino group, a nitro group, an acyl group, or a carboxyl group. For a group having a substituent, the number of carbon atoms given means the number of carbon atoms of the portion not including the substituent. In the present invention, a range expressed with the word "to" indicates a range that includes the preceding and succeeding values as the minimum and maximum, respectively.

The compound denoted by general formula (I) and the compound denoted by general formula (II) are examples of compounds that are desirable as the surface-modifying agent. However, the surface-modifying agent employed in the present invention is able to produce the desired effect so long as it comprises one or more each of the functional group and the alkyl group, and thus is not limited to the compounds denoted by general formulas (I) and (II).

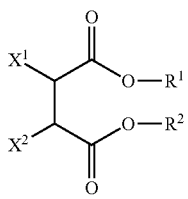

In general formula (I), each of $R^1$ and $R^2$ independently denotes an alkyl group with 5 to 10 carbon atoms. The alkyl group may be linear or branched, but is desirably a branched alkyl group from the perspective of effectively rendering the surface of the magnetic particles hydrophobic.

When the number of carbon atoms of the alkyl groups denoted by $R^1$ and $R^2$ is equal to or greater than 5, the surface of the magnetic particle can be adequately rendered hydrophobic. Conversely, when the number of carbon atoms of these alkyl groups exceeds 10, the water solubility of the compound denoted by general formula (I) decreases. Accordingly, the number of carbon atoms of each alkyl group is equal to or fewer than 10. $R^1$ and $R^2$ may be identical or different. From the perspective of water solubility, a compound such that the sum of the number of carbon atoms of the alkyl group denoted by $R^1$ and the number of carbon atoms of the alkyl group denoted by $R^2$ is equal to or less than 16 is desirable.

In general formula (I), $X^1$ and $X^2$ denote hydrogen atoms or substituents, with either $X^1$ or $X^2$ denoting a functional group that becomes an anionic group in the magnetic liquid. The compound denoted by general formula (I) has a group that becomes an anionic group in the aqueous magnetic liquid, allowing adsorption to the surface of the hexagonal ferrite magnetic particles that have been positively charged with hydrophobic groups $R^1$ and $R^2$ facing outward. Thus, the surface of the hexagonal ferrite magnetic particles can be rendered hydrophobic.

Examples of functional groups that become anionic groups in the magnetic liquid are desirably those capable of suitably dissociating (ionizing) in the aqueous magnetic liquid that satisfies relation (1) above. From this perspective, examples of desirable functional groups are sulfonic acid (salt) groups, sulfuric acid (salt) groups, sulfuric acid ester (salt) groups, carboxylic acid (salt) groups, phosphoric acid (salt) groups, and phosphoric acid ester (salt) groups.

In this context, the term "sulfonic acid (salt) group" includes the sulfonic acid group (—$SO_3H$) and sulfonate groups having an alkali metal as a counter ion, such as —$SO_3Na$, —$SO_3Li$, and —$SO_3K$. The same applies to sulfuric acid (salt) groups, sulfuric acid ester (salt) groups, carboxylic acid (salt) groups, phosphoric acid (salt) groups, and phosphoric acid ester (salt) groups. Since compounds having the above functional group in the form of a sulfonic acid (salt) group are desirable because such compounds have good adsorptivity to the surface of the hexagonal ferrite magnetic particles.

Either $X^1$ or $X^2$ denotes the above functional group, and the other denotes a hydrogen atom or substituent. The details of the substituent are as set forth above. The steric hindrance of the groups present in the vicinity of the anionic group is desirably low to achieve good adsorption of the anionic group on the surface of the hexagonal ferrite magnetic particles. In this regard, whichever among $X^1$ and $X^2$ is not a functional group is desirably a hydrogen atom.

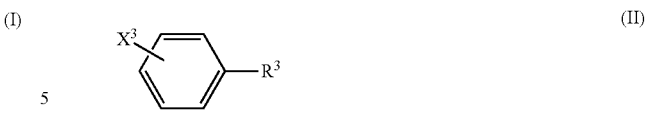

In general formula (II), $R^3$ denotes an alkyl group with 12 to 17 carbon atoms and $X^3$ denotes a functional group that becomes an anionic group in the magnetic liquid described above.

In general formula (II), when the number of carbon atoms of the alkyl group denoted by $R^3$ is equal to or greater than 12, the surface of the magnetic particles can be adequately rendered hydrophobic. Conversely, when the number of carbon atoms of the alkyl group exceeds 17, the water solubility of the compound denoted by general formula (II) decreases. Accordingly, the number of carbon atoms in the alkyl group denoted by $R^3$ is set to equal to or less than 17. The alkyl group denoted by $R^3$ can be linear or branched. From the perspective of the hydrophobic rendering effect on the surface of the hexagonal ferrite magnetic particles, it is desirably linear. Additionally, since the symmetry of structure decreases when it is a branched alkyl group, a branched alkyl group is advantageous relative to a linear alkyl group with an identical number of carbon atoms, from the perspective of enhancing the solubility in water and organic solvents.

In general formula (II), the details of the functional group denoted by $X^3$ are as set forth for general formula (I) above. From the perspective of the effect of rendering the surface of the hexagonal ferrite magnetic particle hydrophobic, the substitution position of the functional group denoted by $X^3$ is desirably the para position.

Both the compound denoted by general formula (I) and the compound denoted by general formula (II) can be synthesized by known methods and are readily available as commercial products. Specific examples of the compound denoted by general formula (I) and the compound denoted by general formula (II) are given below.

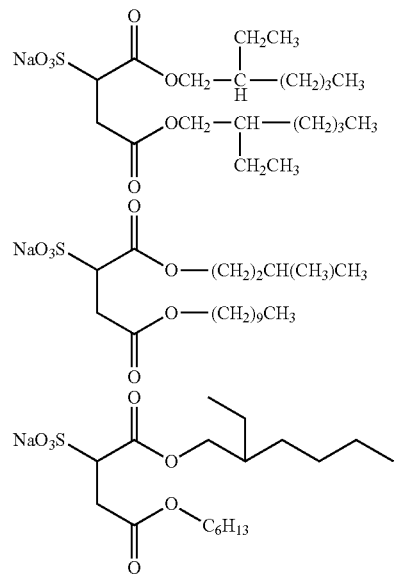

-continued

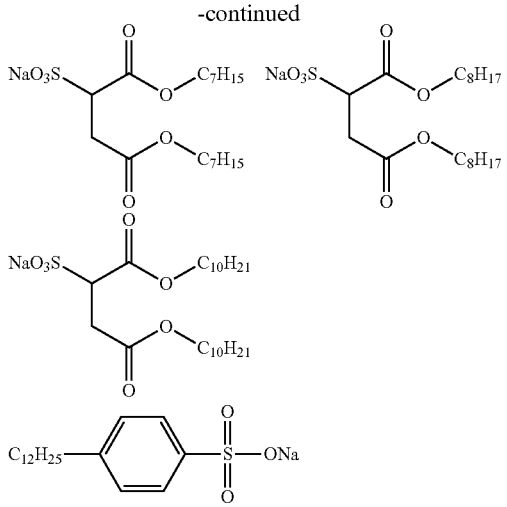

By adding the surface-modifying agent to the aqueous magnetic liquid satisfying relation (1) and desirably stirring the mixture, the surface of the hexagonal ferrite magnetic particles can be modified. Stirring to modify the surface can be conducted with a known dispersing apparatus such as a sand mill. The processing time is not specifically limited and need only be set so that the surface of the hexagonal ferrite magnetic particles is rendered adequately hydrophobic. For example, stifling can be conducted for about 5 minutes to about one hour following addition of the surface-modifying agent.

One or a combination of two or more surface-modifying agents can be employed in the surface-modifying treatment. The surface-modifying agents denoted by general formulas (I) and (II) both can exhibit good surface-modifying effects. The surface-modifying agent denoted by general formula (I) is desirable to achieve a better surface-modifying effect. From the perspective of forming a uniform hydrophobic surface on the hexagonal ferrite magnetic powder following the surface-modifying treatment, the quantity of surface-modifying agent employed is desirably equal to or more than 5 weight parts per 100 weight parts of the magnetic particles. When the quantity employed is excessively large, the surface-modifying agent will sometimes adsorb in two layers to the surface of the hexagonal ferrite magnetic particles, resulting in inadequate hydrophobic rendering. Thus, to achieve adequate hydrophobic rendering, a quantity of equal to or less than 15 weight parts, preferably equal to or less than 10 weight parts, of surface-modifying agent are desirably employed per 100 weight parts of hexagonal ferrite magnetic particles. The use of 10 to 500 times the amount of hexagonal ferrite magnetic particles (based on weight) of water-based solvent is desirable to achieve better surface modification of the hexagonal ferrite magnetic particles.

Following the surface-modifying treatment, removing the water-based solvent from the magnetic liquid yields hexagonal ferrite magnetic particles that can be used to form a magnetic recording medium. In one embodiment, the magnetic particles are collected from the water-based solvent following the surface-modifying treatment. Then, the magnetic particles that have been collected can be employed for the preparation of a magnetic coating material for forming a magnetic recording medium. For example, following the surface-modifying treatment, the magnetic particles can be cleaned by decantation or the like as needed, collected from the water-based solvent by known method such as filtration, and then subjected to a dry treatment. The magnetic particles obtained can then be used to prepare a magnetic coating material for forming a magnetic recording medium by known methods. In another embodiment, without undergoing a drying treatment, a solvent replacement process can be conducted following the surface-modifying treatment to replace the water-based solvent with an organic solvent. The magnetic particles obtained can then be used to prepare a magnetic coating material for forming a magnetic recording medium by the usual methods. Even if the hexagonal ferrite magnetic particles obtained by this processing were to aggregate during drying, as set forth above, the aggregate would be readily dispersed in an organic solvent.

The above solvent replacement can be conducted by a known method. The following method is one example.

The magnetic liquid obtained by the above surface modification processing is passed through a filter. Desirably, the supernatant of the magnetic liquid in which a precipitate has been formed by processing with a surface-modifying agent is removed by decantation to obtain the precipitate, which is passed through a filter. In the above surface modification processing, the surface-modifying agent adsorbs, neutralizing the positive charge of the surface of the hexagonal ferrite magnetic particles. This results in a reduction in the dispersion stability due to the positive charge and electric double layers, and renders the surface of the hexagonal ferrite magnetic particles hydrophobic. Thus, the hexagonal ferrite magnetic particles enter a state in which they tend to precipitate. Accordingly, the hexagonal ferrite magnetic particles naturally precipitate in the water-based solvent, facilitating solid-liquid separation of the magnetic liquid. In the usual glass crystallization method, after having been washed in water, the hexagonal ferrite magnetic particles do not readily settle. Thus, to collect the particles that are ultimately obtained, an aggregating step (long-term standing, addition of an aggregating agent, adjustment of the pH to the vicinity of the isoelectric point of the particles, and the like) is often employed. By contrast, in the present invention, such an aggregating step is unneeded.

Subsequently, before the material captured by the filter dries, a solvent (such as alcohol) that is miscible in both water and the organic solvent employed in the magnetic coating material for forming a magnetic layer is poured onto the filter to remove moisture remaining in the material captured by the filter. Next, pouring an organic solvent onto the filter can replace the water-based solvent with an organic solvent. Using the material captured by the filter that has been obtained in this manner, it is possible to prepare a magnetic coating material by the same method as that used to prepare the magnetic layer coating material of an ordinary magnetic recording medium.

The details of the method of manufacturing a magnetic recording medium using the magnetic coating material obtained will be set forth further below. Based on the present invention, the hexagonal ferrite magnetic particles that have aggregated in the water-based solvent will readily disperse in an organic solvent. Thus, it is possible to achieve a state of a high degree of dispersion in the magnetic coating material for forming a magnetic layer without increasing the dispersion load.

The method of manufacturing a magnetic recording medium of the present invention will be described next.

The method of manufacturing a magnetic recording medium of the present invention comprises manufacturing hexagonal ferrite magnetic powder by the method of manufacturing hexagonal ferrite magnetic powder of the present invention, dispersing the hexagonal ferrite magnetic powder together with an organic solvent and a binder to prepare a magnetic coating material, and forming a magnetic layer with the magnetic coating liquid that has been prepared.

In the method of manufacturing hexagonal ferrite magnetic powder of the present invention, the surface-modifying treatment of the hexagonal ferrite magnetic particles is conducted in a water-based solvent. However, when a magnetic coating material containing a water-based solvent is employed to form a magnetic layer, there is a risk of causing plasticizing and the like, due to the absorption of moisture due to the hydrophilic property of the magnetic layer that is formed. By contrast, in the method of manufacturing a magnetic recording medium of the present invention, a magnetic coating material that is an organic solvent-based one is used to form the magnetic layer. In this context, the term "organic solvent" means a non-water based organic solvent. However, to the extent that problems such as plasticizing do not occur in the magnetic coating material, it is permissible for trace quantities of moisture to remain.

Examples of the organic solvent that is employed in the magnetic coating material are those organic solvents that are generally employed to prepare particulate magnetic recording media. Specific examples thereof are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane; these may be employed in any ratio. Among them, from the perspectives of the solubility of the binders that are commonly employed in magnetic recording media and adsorption of binder onto the surface of the magnetic particles, the use of an organic solvent containing a ketone (ketone-based organic solvent) is desirable.

These organic solvents need not be 100 percent pure and may contain impurities such as isomers, unreacted materials, by-products, decomposition products, oxides and moisture in addition to the main components. The content of these impurities is preferably equal to or less than 30 weight percent, more preferably equal to or less than 10 weight percent. To improve dispersion properties, a solvent having a somewhat strong polarity is desirable. It is desirable that solvents having a dielectric constant equal to or higher than 15 are comprised equal to or higher than 50 weight percent of the solvent composition. Further, the dissolution parameter is desirably 8 to 11.

A specific embodiment of the method of manufacturing a magnetic recording medium of the present invention will be described below.

Magnetic layer

The magnetic layer in the present invention is a layer comprising the hexagonal ferrite magnetic particles that have been processed as set forth above and a binder. The details of the method of manufacturing the hexagonal ferrite magnetic particles are as set forth above.

Examples of the binder for use in the magnetic coating material employed for the formation of magnetic layer are: polyurethane resins; polyester resins; polyamide resins; vinyl chloride resins; styrene; acrylonitrile; methyl methacrylate and other copolymerized acrylic resins; nitrocellulose and other cellulose resins; epoxy resins; phenoxy resins; and polyvinyl acetal, polyvinyl butyral, and other polyvinyl alkyral resins. These may be employed singly or in combinations of two or more. Of these, the desirable binders are the polyurethane resins, acrylic resins, cellulose resins, and vinyl chloride resins. These resins may also be employed as binders in the nonmagnetic layer described further below. Reference can be made to paragraphs [0029] to [0031] in Japanese Unexamined Patent Publication (KOKAI) No. 2010-24113, which is expressly incorporated herein by reference in its entirety, for details of the binder. A polyisocyanate curing agent may also be employed with the above resins.

As needed, additives can be added to the magnetic layer. Examples of additives are: abrasives, lubricants, dispersing agents, dispersion adjuvants, antifungal agents, antistatic agents, oxidation inhibitors, and carbon black. These additives may be employed in the form of a commercial product suitably selected based on desired properties.

Examples of types of carbon black that are suitable for use in the magnetic layer are: furnace black for rubber, thermal for rubber, black for coloring, and acetylene black. It is preferable that the specific surface area is 5 to 500 $m^2/g$, the DBP oil absorption capacity is 10 to 400 ml/100 g, the particle diameter is 5 to 300 nm, the pH is 2 to 10, the moisture content is 0.1 to 10 percent, and the tap density is 0.1 to 1 g/ml. When employing carbon black, the quantity desirably ranges from 0.1 to 30 weight percent with respect to the weight of the ferromagnetic powder. For example, the *Carbon Black Handbook* compiled by the Carbon Black Association, which is expressly incorporated herein by reference in its entirety, may be consulted for types of carbon black suitable for use in the magnetic layer. Commercially available carbon black can be employed.

Nonmagnetic layer

Details of the nonmagnetic layer will be described below. In the present invention, a nonmagnetic layer comprising a nonmagnetic powder and a binder can be formed between the nonmagnetic support and the magnetic layer. Both organic and inorganic substances may be employed as the nonmagnetic powder in the nonmagnetic layer. Carbon black may also be employed. Examples of inorganic substances are metals, metal oxides, metal carbonates, metal sulfates, metal nitrides, metal carbides, and metal sulfides. These nonmagnetic powders are commercially available and can be manufactured by the known methods. Reference can be made to paragraphs [0036] to [0039] in Japanese Unexamined Patent Publication (KOKAI) No. 2010-24113 for details thereof.

Binders, lubricants, dispersing agents, additives, solvents, dispersion methods, and the like suited to the magnetic layer may be adopted to the nonmagnetic layer. In particular, known techniques for the quantity and type of binder resin and the quantity and type of additives and dispersing agents employed in the magnetic layer may be adopted thereto. Carbon black and organic powders can be added to the nonmagnetic layer. Reference can be made to paragraphs [0040] to [0042] in Japanese Unexamined Patent Publication (KOKAI) No. 2010-24113 for details thereof.

Nonmagnetic support

The magnetic coating material that has been prepared by the above method is coated directly, or through another layer such as a nonmagnetic layer, on the nonmagnetic support. As a result, a magnetic recording medium having the magnetic layer on the nonmagnetic support, as needed, through another layer such as a nonmagnetic layer can be obtained.

A known film such as biaxially-oriented polyethylene terephthalate, polyethylene naphthalate, polyamide, polyamidoimide, or aromatic polyamide can be employed as the nonmagnetic support. Of these, polyethylene terephthalate, polyethylene naphthalate, and polyamide are preferred.

These supports can be corona discharge treated, plasma treated, treated to facilitate adhesion, heat treated, or the like in advance. The center average roughness, Ra, at a cutoff value of 0.25 mm of the nonmagnetic support suitable for use in the present invention desirably ranges from 3 to 10 nm.

Layer structure

As for the thickness structure of the magnetic recording medium obtained by the present invention, the thickness of the nonmagnetic support desirably ranges from 3 to 80 µm. The thickness of the magnetic layer can be optimized based on the saturation magnetization of the magnetic head employed, the length of the head gap, and the recording signal band, and is normally 10 to 150 nm, desirably 20 to 120 nm, and preferably, 30 to 100 nm. At least one magnetic layer is sufficient. The magnetic layer may be divided into two or more layers having different magnetic characteristics, and a known configuration relating to multilayered magnetic layer may be applied.

The nonmagnetic layer is, for example, 0.1 to 3.0 µm, desirably 0.3 to 2.0 µm, and preferably, 0.5 to 1.5 µm in thickness. The nonmagnetic layer of the magnetic recording medium of the present invention can exhibit its effect so long as it is substantially nonmagnetic. It can exhibit the effect of the present invention, and can be deemed to have essentially the same structure as the magnetic recording medium of the present invention, for example, even when impurities are contained or a small quantity of magnetic material is intentionally incorporated. The term "essentially the same" means that the residual magnetic flux density of the nonmagnetic layer is equal to or lower than 10 mT, or the coercive force is equal to or lower than 7.96 kA/m (equal to or lower than 100 Oe), with desirably no residual magnetic flux density or coercive force being present.

Backcoat layer

A backcoat layer can be provided on the surface of the nonmagnetic support opposite to the surface on which the magnetic layer are provided, in the present invention. The backcoat layer desirably comprises carbon black and inorganic powder. The formula of the magnetic layer or non-magnetic layer can be applied to the binder and various additives for the formation of the backcoat layer. The backcoat layer is preferably equal to or less than 0.9 µm, more preferably 0.1 to 0.7 µm, in thickness.

Manufacturing process

With the exception that the hexagonal ferrite magnetic powder obtained by the method of manufacturing hexagonal ferrite magnetic powder of the present invention is employed, the coating liquid (magnetic coating material) for forming the magnetic layer is prepared by the same method as that used to prepare an ordinary magnetic layer coating liquid.

The process for manufacturing magnetic layer, nonmagnetic layer and backcoat layer coating liquids normally comprises at least a kneading step, a dispersing step, and a mixing step to be carried out, if necessary, before and/or after the kneading and dispersing steps. Each of the individual steps may be divided into two or more stages. All of the starting materials employed in the present invention, including the magnetic powder, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. Details of the kneading process are described in Japanese Unexamined Patent Publication (KOKAI) Heisei Nos. 1-106338 and 1-79274. The contents of these applications are incorporated herein by reference in their entirety. Further, glass beads may be employed to disperse the magnetic layer, nonmagnetic layer and backcoat layer coating liquids. Dispersing media with a high specific gravity such as zirconia beads, titania beads, and steel beads are also suitable for use. The particle diameter and filling rate of these dispersing media can be optimized for use. A known dispersing device may be employed. Reference can be made to paragraphs [0051] to [0057] in Japanese Unexamined Patent Publication (KOKAI) No. 2010-24113 for details of the method of manufacturing a magnetic recording medium.

The present invention permits the formation of a magnetic layer in which the hexagonal ferrite magnetic powder is highly dispersed. Thus, the present invention can provide a magnetic recording medium for high-density recording that achieves good electromagnetic characteristics. That is, the magnetic recording medium obtained by the manufacturing method of the present invention is suitable as a magnetic recording medium for high-density recording. For example, the magnetic recording medium of the present invention can be used to record a magnetic signal at linear recording densities of 400 Kbpi and above and reproduce the magnetic signal. In particular, the magnetic recording medium of the present invention can exhibit a high SNR in systems exceeding a linear recording density of 500 Kbpi, and the improvement in the SNR is marked in systems with linear recording densities of 550 Kbpi and above. The linear recording density is preferably 550 to 600 Kbpi.

A magnetoresistive (MR) head is desirably employed to reproduce with high sensitivity magnetic signals that have been recorded at high densities. Since MR heads are highly sensitive, noise also tends to be detected with high sensitivity. The magnetic recording medium of the present invention makes it possible to reduce the noise caused by aggregation of microparticulate magnetic material, so a high SNR can be achieved in reproduction with MR heads. From the perspective of high sensitivity reproduction, it is desirable to employ an MR head with a shield spacing of 0.05 to 0.2 µm.

EXAMPLES

The present invention will be described in detail below based on examples. However, the present invention is not limited to the examples. The terms "parts" and "percent" given in Examples are weight parts and weight percent unless specifically stated otherwise.

1. Example of Preparation of Crystallized Product

Preparation of crystallized product A

Prescribed quantities of $H_3BO_3$ corresponding to $B_2O_3$, $Al(OH)_3$ corresponding to $Al_2O_3$, $BaCO_3$ corresponding to $BaO$, and $Fe_2O_3$ were weighed out so as to yield, based on the oxides, 23.0 mole percent of $B_2O_3$, 8.7 mole percent of $Al_2O_3$, 37.0 mole percent of $BaO$, and 31.3 mole percent of $Fe_2O_3$. The mixture was mixed in a mixer and charged to a two-liter platinum crucible. Following melting, cooling was conducted with water-cooled rolls to obtain an amorphous product. A 600 g quantity of the amorphous product obtained was charged to an electric furnace, and the temperature was raised to 720° C. at 4° C./minute and maintained for 5 hours, causing hexagonal ferrite to crystallize (precipitate).

Preparation of crystallized product B

Prescribed quantities of $H_3BO_3$ corresponding to $B_2O_3$, $Al(OH)_3$ corresponding to $Al_2O_3$, $BaCO_3$ corresponding to BaO, and $Fe_2O_3$ were weighed out so as to yield, based on the oxides, 26.3 mole percent of $B_2O_3$, 5.4 mole percent of $Al_2O_3$, 37.0 mole percent of BaO, and 31.3 mole percent of $Fe_2O_3$. The mixture was mixed in a mixer (after replacing a portion of the Fe with Co=0.5 at %, Zn=1.5 at %, and Nb=1 at %) and charged to a two-liter platinum crucible. Following melting, cooling was conducted with water-cooled rolls to obtain an amorphous product. A 600 g quantity of the amorphous product obtained was charged to an electric furnace, and the temperature was raised to 700° C. at 4° C./minute and maintained for 5 hours, causing hexagonal ferrite to crystallize (precipitate).

Preparation of crystallized product C

Prescribed quantities of $H_3BO_3$ corresponding to $B_2O_3$, $Al(OH)_3$ corresponding to $Al_2O_3$, $BaCO_3$ corresponding to BaO, and $Fe_2O_3$ were weighed out so as to yield, based on the oxides, 22.8 mole percent of $B_2O_3$, 1.5 mole percent of $Al_2O_3$, 31.7 mole percent of BaO, and 44.0 mole percent of $Fe_2O_3$. The mixture was mixed in a mixer (after replacing a portion of the Fe with Zn=1.5 at %, and Nb=0.75 at %) and charged to a two-liter platinum crucible. Following melting, cooling was conducted with water-cooled rolls to obtain an amorphous product. A 600 g quantity of the amorphous product obtained was charged to an electric furnace, and the temperature was raised to 660° C. at 4° C./minute and maintained for 5 hours, causing hexagonal ferrite to crystallize (precipitate).

Preparation of crystallized product D

Prescribed quantities of corresponding oxides were weighed out so as to yield, based on the oxides, 4.7 mole percent of $B_2O_3$, 10.0 mole percent of $BaCO_3$, 10.8 mole percent of $Fe_2O_3$ (Si/Fe (atomic ratio)=0.005), 0.54 mole percent of $CoCO_3$, 0.50 mole percent of ZnO, and 0.12 mole percent of $Nb_2O_5$. The mixture was mixed in a mixer (after replacing a portion of the Fe with Zn=1.5 at %, and Nb=0.75 at %) and charged to a two-liter platinum crucible. Following melting, cooling was conducted with water-cooled rolls to obtain an amorphous product. A 600 g quantity of the amorphous product obtained was charged to an electric furnace maintained at 525° C. and the temperature was maintained for 5 hours. The product was then immediately charged to an electric furnace maintained at 680° C., and the temperature was maintained for 5 hours, causing hexagonal ferrite to crystallize (precipitate).

2. Examples and Comparative Examples of the Preparation of Magnetic Recording Media and Hexagonal Ferrite Magnetic Particles Examples 1 to 9 and Comparative Examples 3 to 5

Each of the heat-treated products that had undergone crystallization to obtain the crystallized products indicated in Table 1 was coarsely pulverized in a mortar, charged to a three-liter pot mill, and comminuted for 4 hours in a ball mill with 5 kg of Zr balls 5 mm in diameter and 1.2 kg of pure water. Subsequently, the comminuted liquid was separated from the balls and charged to a five-liter stainless steel beaker. The product was mixed in a 3:1 ratio (based on weight) with a 30 percent acetic acid solution, and while maintaining a temperature of 85° C., the glass component was dissolved by acid treatment with stifling for two hours. The solid product was settled and the supernatant was removed by decantation, yielding magnetic particles in the from of a sediment. Pure water was poured into the beaker in which the sediment remained to make 5 liters. While maintaining the mixture at 70° C., the pH was adjusted as indicated in Table 1 with 1 N hydrochloric acid or NaOH solution. Subsequently, the equivalent of 5 parts of surface-modifying agent per 100 parts of magnetic powder was added and the mixture was stirred for 30 minutes. Subsequently, cleaning by decantation (water washing) was conducted the number of times indicated in Table 1, and the product was dried, yielding hexagonal ferrite magnetic powder.

Comparative Example 1

A 600 g quantity of a heat-treated product that had undergone crystallization (crystallized product A) was coarsely pulverized in a mortar and comminuted for 4 hours in a ball mill with 5 kg of Zr balls 5 mm in diameter and 1.2 kg of pure water. Subsequently, the comminuted liquid was separated from the balls and charged to a five-liter stainless steel beaker. The product was mixed in a 3:1 ratio (based on weight) with a 30 percent acetic acid solution, and while maintaining a temperature of 85° C., acid treated with stifling for two hours. Subsequently, cleaning by decantation (water washing) was repeatedly conducted and the product was dried, yielding hexagonal ferrite magnetic powder.

Comparative Example 2

Processing identical to that in paragraph [0064] of Japanese Unexamined Patent Publication (KOKAI) No. 2004-30828 was conducted to prepare magnetic particles identical to Manufacturing Example 2.

3. Evaluation of the Magnetic Particles (1) Isoelectric point (pH0) of barium ferrite magnetic particles following acid treatment Portions of the liquids following acid treatment were collected in the Examples and comparative examples and diluted with water to a magnetic particle concentration of 0.02 percent. The liquids were then adjusted with acid or alkali solutions to determine the pH at which the zeta potential reached 0 mV. The zeta potential was measured with a Zetasizer Nano series made by Sysmex.

(2) Measurement of Change in Magnetic Characteristics (Coercive Force)

To confirm the effect of the above pH adjustment on the magnetic particles, portions of the magnetic particles were collected before and after pH adjustment and dried. The coercive force of the dried powder was measured with a vibrating sample-type fluxmeter (Toei-Kogyo Co. Ltd.) at an applied magnetic field of 1,194 kA/m (15 kOe) at 23° C. A determination was made as to whether or not the pH adjustment affected the melting of the magnetic particles based on the difference ΔHc in the coercive force before and after pH adjustment.

4. Formula of Magnetic Layer Coating Liquid

| | |
|---|---|
| Barium ferrite magnetic particles obtained above | 100 parts |
| Polyurethane resin | 5 parts |
| Branched side chain-containing polyesterpolyol/diphenyl- | |
| methane diisocyanate, —SO$_3$Na = 0.07 meq/g | |
| Vinyl chloride copolymer (MR 104 made by Zeon Corp.) | 10 parts |
| Oleic acid | 10 parts |
| α-Alumina (particle size: 0.15 μm) | 5 part |
| Carbon black (average particle diameter: 20 nm) | 0.5 parts |
| Cyclohexanone | 110 parts |
| Methyl ethyl ketone | 100 parts |
| Toluene | 100 parts |
| Butyl stearate | 2 parts |
| Stearic acid | 1 part |

5. Preparation of Magnetic Layer Coating Liquid

A magnetic layer coating liquid was prepared as follows. The barium ferrite and oleic acid were dry dispersed for 15 minutes, the dispersion and the above magnetic layer components were kneaded in an open kneader, and the product was dispersed in a sand mill for the period indicated in Table 1. To the dispersion obtained were added three parts of polyisocyanate (Coronate L made by Nippon Polyurethane Industry Co., Ltd.) and 40 parts of a mixed solvent of methyl ethyl ketone and cyclohexanone. The mixture was mixed, stirred, and filtered using a filter having a pore size of 1 μm to prepare the magnetic layer coating liquid.

6. Formula of Nonmagnetic Layer Coating Liquid

| | |
|---|---|
| Nonmagnetic inorganic powder | 85 parts |
| α-Iron oxide | |
| Surface treatment layers: Al$_2$O$_3$, SiO$_2$ | |
| Mean major axis length: 0.15 μm | |
| Average acicular ratio: 7 | |
| Specific surface are by BET method: 52 m$^2$/g | |
| pH: 8 | |
| Carbon black | 15 parts |
| Vinyl chloride copolymer (MR110 made by Zeon Corp.) | 10 parts |
| Polyurethane resin | 10 parts |
| Branched side chain-containing polyesterpolyol/diphenyl- | |
| methane diisocyanate, —SO$_3$Na = 0.2 meq/g | |
| Phenylphosphonic acid | 5 parts |
| Cyclohexanone | 140 parts |
| Methyl ethyl ketone | 170 parts |
| Butyl stearate | 2 parts |
| Stearic acid | 1 part |

7. Preparation of Nonmagnetic Layer Coating Liquid

The nonmagnetic layer coating liquid was prepared as follows. The various components were kneaded in an open kneader and then dispersed using a sand mill. To the dispersion obtained were added four parts of polyisocyanate (Coronate L made by Nippon Polyurethane Industry Co., Ltd.) and 40 parts of a mixed solvent of methyl ethyl ketone and cyclohexanone. The product was mixed, stirred, and filtered with a filter having a pore size of 1 μm to prepare the nonmagnetic layer coating liquid.

8. Formula of Backcoat Layer Coating Liquid

| | |
|---|---|
| Microparticulate carbon black powder | 100 parts |
| (BPr800 made by Cabot, average particle size: 17 nm) | |
| Coarse particulate carbon black powder | 10 parts |
| (Thermal black, made by Cancarb, average | |
| particle size: 270 nm) | |
| α-Alumina (hard inorganic powder) | 2 parts |
| Average particle size: 200 nm, Mohs hardness: 9 | |
| Nitrocellulose resin | 140 parts |
| Polyurethane resin | 15 parts |
| Polyester resin | 5 parts |
| Dispersing agents: Copper oleate | 5 parts |
| Copper phthalocyanine | 5 parts |
| Barium sulfate | 5 parts |
| (BF-1 made by Sakai Chemical Industries (Ltd.), | |
| average particle diameter 50 nm; Mohs hardness: 3) | |
| Methyl ethyl ketone | 1,200 parts |
| Butyl acetate | 300 parts |
| Toluene | 600 parts |

9. Preparation of Backcoat Layer Coating Liquid

A backcoat layer coating liquid was prepared as follows. The above components were kneaded in a continuous kneader and then dispersed using a sand mill. To the dispersion obtained were added 40 parts of polyisocyanate (Coronate L made by Nippon Polyurethane Industry Co., Ltd.) and 1,000 parts of methyl ethyl ketone. The mixture was stirred and filtered using a filter having a pore diameter of 1 μm, yielding the backcoat layer coating liquid.

10. Preparation of Magnetic Tape

The nonmagnetic layer coating liquid and magnetic layer coating liquid that had been obtained were simultaneously laminated on a support (biaxially oriented polyethylene terephthalate) 5 μm in thickness in quantities calculated to yield a nonmagnetic layer film thickness upon drying of 1.0 μm, a magnetic layer film thickness upon drying of 0.10 μm, and a total tape thickness of 6.6 μm upon drying. They were then dried. Subsequently, a backcoat layer was applied to yield a thickness upon drying of 0.5 μm on the opposite side from the magnetic layer.

Subsequently, calendering was conducted at 80° C. at a linear pressure of 350 kg/cm (343 kN/m) at a rate of 100 m/minute with a seven-stage calender comprised solely of metal rolls, and the roll obtained was heat treated for 48 hours at 60° C. Next, the roll was cut to ½ inch width to prepare a magnetic tape.

11. Particle Diameter in Liquid of Magnetic Particles in Magnetic Layer Coating Liquid Portions of each of the magnetic layer coating liquids prepared in the Examples and comparative examples were collected. Each of the liquids collected was diluted with a 1:1 (weight ratio) mixed solvent of methyl ethyl ketone and cyclohexanone to a barium ferrite concentration of 0.2 percent. The particle size distribution of the barium ferrite magnetic particles in the diluted liquid prepared was measured with an LB-500 Dynamic Light-Scattering Particle Size Distribution Analyzer made by Horiba (measurement was repeated 50 times). The maximum diameter corresponding to 50 percent of the cumulative distribution curve of the particle size distribution measured was adopted as the particle diameter in liquid in the magnetic coating material. The smaller the particle diameter in liquid, the better the magnetic particle distribution in the magnetic layer coating liquid indicated.

12. Evaluation of Electromagnetic Characteristics (SNR)

The SNRs of the various magnetic tapes of the Examples and comparative examples were measured in a fixed-head ½ inch linear system by the following method. The relative head/tape speed was 10 m/s.

A saturation flux density 1.8 T MIG head (gap length: 0.2 μm, track width: 8 μm) was employed as the recording head to record a magnetic signal in the longitudinal direction of the tape at a linear recording density of 600 kbpi with the recording current set to the optimal recording current for each tape. The recorded magnetic signal was reproduced using a reproduction head in the form of an anisotropic MR head (A-MR) with a shield spacing of 0.05 μm and an element thickness of 15 nm. The reproduced signal was frequency analyzed with a spectrum analyzer made by Shibasoku. The ratio of the output of the carrier signal to the integral noise of the full band spectrum was adopted as the SNR.

eter in liquid was greater than that in the Examples and dispersibility was poor.

(3) In Comparative Examples 2, 3, and 5, (pH0−pH*) was less than 2.5 or the effect of the surface-modifying agent employed was insufficient. Thus, despite preparation of the magnetic layer coating liquid for a dispersion processing

TABLE 1

| | Magnetic material | | | pH adjustment after acid treatment and surface-modifying treatment | | | | |
|---|---|---|---|---|---|---|---|---|
| | Crystallized product | Al content based on Al$_2$O$_3$ conversion [mol %] | pH 0 | Washing Number of times | pH* | pH 0 − pH* | Surface-modifying agent | |
| Ex. 1 | A | 8.7 | 10.0 | 1 | 3.0 | 7.0 | Di(2-ethylhexyl)sulfosuccinate sodium salt | |
| Ex. 2 | B | 5.4 | 9.0 | 1 | 3.0 | 6.0 | Di(2-ethylhexyl)sulfosuccinate sodium salt | |
| Ex. 3 | C | 1.5 | 8.0 | 1 | 3.0 | 5.0 | Di(2-ethylhexyl)sulfosuccinate sodium salt | |
| Ex. 4 | A | 8.7 | 10.0 | 1 | 2.3 | 7.7 | Di(2-ethylhexyl)sulfosuccinate sodium salt | |
| Ex. 5 | C | 1.5 | 8.0 | 1 | 5.3 | 2.7 | Di(2-ethylhexyl)sulfosuccinate sodium salt | |
| Ex. 6 | C | 1.5 | 8.0 | 1 | 3.0 | 5.0 | Decylisopentyl sulfosuccinate sodium salt | |
| Ex. 7 | C | 1.5 | 8.0 | 1 | 3.0 | 5.0 | Sodium dodecylbenzenesulfonate | |
| Ex. 8 | C | 1.5 | 8.0 | 1 | 3.0 | 5.0 | 2-(Sodiosulfo)succinic acid didecyl ester | |
| Ex. 9 | D | 0.0 | 7.5 | 1 | 3.0 | 4.5 | Di(2-ethylhexyl)sulfosuccinate sodium salt | |
| Comp. Ex. 1 | A | 8.7 | 10.0 | pH adjustment and surface-modifying treatment were not conducted | | | | |
| Comp. Ex. 2 | D | 0.0 | 7.5 | 3 | 6.0 | 1.5 | Phenylphosphonic acid | |
| Comp. Ex. 3 | D | 0.0 | 7.5 | 1 | 5.3 | 2.2 | Di(2-ethylhexyl)sulfosuccinate sodium salt | |
| Comp. Ex. 4 | A | 8.7 | 10.0 | 1 | 1.8 | 8.2 | Di(2-ethylhexyl)sulfosuccinate sodium salt | |
| Comp. Ex. 5 | C | 1.5 | 8.0 | 1 | 3.0 | 5.0 | Sodium polyacrylate[molecular weight: 2000] | |

| | pH adjustment after acid treatment and surface-modifying treatment ΔHc [Oe] | Dispersion in the presence of organic solvent | | |
|---|---|---|---|---|
| | | Period of processing with sand mill [h] | Average particle diameter [nm] | SNR [dB] |
| Ex. 1 | 30 or less | 6 | 23 | 2.2 |
| Ex. 2 | 30 or less | 6 | 25 | 2.0 |
| Ex. 3 | 30 or less | 6 | 28 | 1.7 |
| Ex. 4 | 30 or less | 6 | 20 | 2.5 |
| Ex. 5 | 30 or less | 6 | 33 | 0.8 |
| Ex. 6 | 30 or less | 6 | 28 | 1.7 |
| Ex. 7 | 30 or less | 6 | 28 | 1.7 |
| Ex. 8 | 30 or less | 6 | 28 | 1.7 |
| Ex. 9 | 30 or less | 6 | 30 | 1.3 |
| Comp. Ex. 1 | 30 or less | 18 | 38 | 0.0 |
| Comp. Ex. 2 | 30 or less | 18 | 35 | 0.0 |
| Comp. Ex. 3 | 30 or less | 18 | 30 | 0.8 |
| Comp. Ex. 4 | 150 or higher | 6 | 23 | −2.0 |
| Comp. Ex. 5 | 30 or less | 18 | 150 | −4.8 |

Evaluation of results

The following points can be confirmed based on the results given in Table 1.

(1) The particle diameters in liquid given in Table 1 as set forth above were indicators of the dispersibility of the magnetic particles. In Comparative Example 4, although the particle diameter in liquid was similar to that of the Examples and dispersibility was good, the SNR was poorer than that of the Examples. That was because a strong acid treatment corresponding to a pH* of less than 2.0 was conducted, causing the magnetic particles to dissolve and compromising magnetic characteristics (the value of ΔHc was high, as shown in Table 1).

(2) In Comparative Example 1, magnetic particles prepared by the usual glass crystallization method were employed to prepare a magnetic tape. Despite preparation of the magnetic layer coating liquid for a dispersion period three-fold that employed in the Examples, the particle diameter in liquid was greater than that in the Examples and dispersibility was poor.

(4) By contrast, in the Examples, the particle diameter in liquid was low and dispersibility of the magnetic particles in the magnetic layer coating liquid was good, yielding magnetic tapes exhibiting high SNRs.

(5) Through a comparison of Examples 1 to 3, it was possible to confirm that the greater the quantity of aluminum in the starting material mixture in the glass crystallization method, the higher pH0 became. Raising pH0 increased the value of (pH0−pH*) for a given pH (pH*) adjusted by wet processing. Thus, the use of aluminum was advantageous for readily enhancing the dispersibility of the magnetic particles.

The present invention is useful in the field of manufacturing magnetic recording media for high-density recording.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method of manufacturing a magnetic recording medium, which comprises:
   (a) manufacturing hexagonal ferrite magnetic powder by the following method:
   preparing a melt by melting a starting material mixture comprising a hexagonal ferrite-forming component and a glass-forming component and rapidly cooling the melt to obtain a solidified product,
   heating the solidified product to precipitate hexagonal ferrite magnetic particles and crystallized glass components in the solidified product,
   subjecting the solidified product to an acid treatment following the heating to remove the glass components by dissolution,
   wet processing the hexagonal ferrite magnetic particles obtained following the acid treatment in a water-based solvent to prepare an aqueous magnetic liquid satisfying relation (1) relative to an isoelectric point of the hexagonal ferrite magnetic particles:

$$pH0 - pH^* \geq 2.5 \quad (1)$$

where in relation (1), pH0 denotes the isoelectric point of the hexagonal ferrite magnetic particles and pH* denotes a pH of the aqueous magnetic liquid, which is a value of equal to or greater than 2.0,
   adding a surface-modifying agent comprising an alkyl group and a functional group that becomes an anionic group in the aqueous magnetic liquid to the aqueous magnetic liquid to subject the hexagonal ferrite magnetic particles to a surface-modifying treatment, and
   removing the water-based solvent following the surface-modifying treatment to obtain hexagonal ferrite magnetic particles,
   (b) dispersing the hexagonal ferrite magnetic powder together with an organic solvent and a binder to prepare a magnetic coating material, and
   (c) forming a magnetic layer with the magnetic coating material that has been prepared,
   wherein the starting material mixture for the method of manufacturing hexagonal ferrite magnetic powder comprises 1.0 to 10.0 mole percent of Al, based on $Al_2O_3$ conversion, relative to the total of the starting material mixture based on oxide conversion.

2. The method of manufacturing a magnetic recording medium according to claim 1, wherein the organic solvent comprises a ketone solvent.

3. The method of manufacturing a magnetic recording medium according to claim 1, wherein the surface-modifying agent in the method of manufacturing hexagonal ferrite magnetic powder is selected from the group consisting of a compound denoted by general formula (I) and a compound denoted by general formula (II):

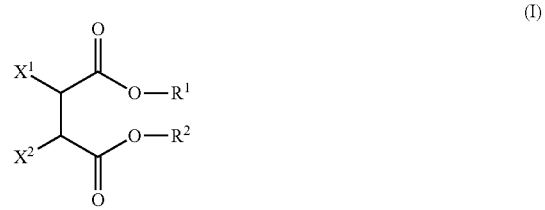

wherein, in general formula (I), each of $R^1$ and $R^2$ independently denotes an alkyl group with 5 to 10 carbon atoms; and $X^1$ and $X^2$ denote hydrogen atoms or substituents, with either $X^1$ or $X^2$ denoting a functional group that becomes an anionic group in the magnetic liquid;

wherein, in general formula (II), $R^3$ denotes an alkyl group with 12 to 17 carbon atoms, and $X^3$ denotes a functional group that becomes an anionic group in the magnetic liquid.

4. The method of manufacturing a magnetic recording medium according to claim 1, wherein the wet processing in the method of manufacturing hexagonal ferrite magnetic powder comprises pH adjustment with addition of acid.

5. The method of manufacturing a magnetic recording medium according to claim 1, wherein in the method of manufacturing hexagonal ferrite magnetic powder, a functional group that becomes an anionic group in the magnetic liquid is a sulfonic acid group or a sulfonate group.

6. The method of manufacturing a magnetic recording medium according to claim 1, wherein, in general formula (I), either $X^1$ or $X^2$ denotes the functional group that becomes an anionic group in the magnetic liquid, and the other denotes a hydrogen atom.

7. The method of manufacturing a magnetic recording medium according to claim 1, wherein the wet processing is conducted in a cleaning process with water-based solvent.

* * * * *